US007965487B2

(12) United States Patent
Seto et al.

(10) Patent No.: US 7,965,487 B2
(45) Date of Patent: Jun. 21, 2011

(54) NEUTRALIZATION APPARATUS HAVING MINUTE ELECTRODE ION GENERATION ELEMENT

(75) Inventors: Takafumi Seto, Tsukuba (JP); Makoto Hirasawa, Tsukuba (JP); Masaaki Tsuji, Tsukuba (JP); Akira Okuyama, Tokyo (JP); Susumu Saito, Tokyo (JP)

(73) Assignees: FISA Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 392 days.

(21) Appl. No.: 12/224,564

(22) PCT Filed: Mar. 3, 2006

(86) PCT No.: PCT/JP2006/304121
§ 371 (c)(1),
(2), (4) Date: Aug. 29, 2008

(87) PCT Pub. No.: WO2007/102191
PCT Pub. Date: Sep. 13, 2007

(65) Prior Publication Data
US 2009/0027825 A1 Jan. 29, 2009

(51) Int. Cl.
*H02H 3/00* (2006.01)
*H02H 3/04* (2006.01)
*G03G 15/02* (2006.01)

(52) U.S. Cl. ......... 361/213; 361/212; 361/225; 361/229

(58) Field of Classification Search .................. 361/213, 361/229, 212, 225
See application file for complete search history.

(56) References Cited

U.S. PATENT DOCUMENTS 4,265,641 A * 5/1981 Natarajan ......................... 95/79
5,746,051 A * 5/1998 Kieser et al. ..................... 60/275
6,252,233 B1 * 6/2001 Good ........................ 250/423 R
2007/0109711 A1 5/2007 Sekoguchi et al.

FOREIGN PATENT DOCUMENTS

JP 2003249327 A * 9/2003
WO WO/2004/102755 A2 11/2004

* cited by examiner

*Primary Examiner* — Jared J Fureman
*Assistant Examiner* — Zeev Kitov
(74) *Attorney, Agent, or Firm* — Roylance, Abrams, Berdo & Goodman, LLP

(57) ABSTRACT

A neutralization apparatus comprising an ion generation element employing a novel, high efficiency discharge system capable of generating high concentration ions with a low ozone concentration. In the neutralization apparatus, the ion generation element is a minute electrode ion generation element consisting of a discharge electrode and an induction electrode having minute protrusions arranged in one direction on a plane, and a thin dielectric film sandwiched between them. The ion generation element is constituted of a set of a minute electrode ion generation element for generating positive ions and a minute electrode ion generation element for generating negative ions, characterized in that at least one or more ion generating elements are disposed so that the plane including each discharge electrode is parallel with the direction of gas flow and discharge electrodes are arranged perpendicularly to the direction of gas flow, and balanced control of positive and negative ions can be carried out at a position on the downstream side of gas flow by regulating a voltage applied to the discharge electrode of the ion generation element.

6 Claims, 7 Drawing Sheets

NEUTRALIZATION APPARATUS HAVING MINUTE ELECTRODE ION GENERATION ELEMENT

BACKGROUND OF THE INVENTION

1. Field of the Invention

The present invention relates to a neutralization apparatus having a minute electrode ion generation element, and more specifically, to a technique of neutralizing static electricity caused on an object surface, and a neutralization apparatus having a minute electrode ion generation element used for easily eliminating static electricity constituting a problem in various manufacturing processes.

2. Description of the Prior Art

The occurrence of static electricity in manufacturing processes can possibly result in reducing productivity and yields or causing electrical problems. Therefore, the neutralization technique of neutralizing and eliminating static electricity on an object surface by adhesion of positive and negative bipolar ions has been widely employed as an important technique for active control of static electricity. The neutralization technique with use of bipolar ions has been discussed in detail heretofore (see Non-patent Document 1) and commercialized by many manufacturers so far. Such neutralization apparatuses have widely been used in manufacturing processes of semiconductors, plastics, liquid crystals, etc.

A general configuration of neutralization apparatuses is such that an electrode for generating bipolar ions and a power supply, and a gas flow generating device for carrying the generated ions to an object are combined. For generation of positive and negative bipolar ions, air ionization by corona discharge or soft X-rays etc., is employed. The generated positive and negative bipolar ions are carried by gas flow or an electrostatic field etc., and adhere to an oppositely-charged physical object, thereupon reaching neutralization of its static electricity.

For apparatuses for eliminating static electricity, bipolar ion generating devices having a needle-type or wire-type electrode and employing corona discharge are most frequently used. This kind of ion generating device is described in detail in, for example, Non-patent Document 1, and an example of its configuration is shown in FIG. 12. In the device, gas molecules are ionized in the vicinity of a distal end of a discharge electrode 21, so that a large amount of ions are generated. In order to generate more or less the same number of positive and negative ions, application of a positive and a negative direct current voltage to different discharge electrodes respectively as disclosed in Patent Document 1 or application of an alternating current voltage as disclosed in Patent Document 2 are carried out. The positive and negative bipolar ions thus generated adhere to a charged physical object with Brownian movement in the course of being carried by gas flow, thereupon changing a surface potential of the object. As for adhesion probability of ions to a charged physical object in a circumstance where positive ions exist in an equivalent number to negative ions, adhesion probability of ions having a polarity opposite to an electric charge of particles exceeds adhesion probability of ions having the same polarity as particles. As a result, adhesion reaction between the positive and negative bipolar ions and the physical object brings the object surface into an uncharged state.

Herein, ion concentration is a parameter that determines a speed with which static electricity is neutralized, that is, the neutralization speed. Accordingly, in manufacturing processes requiring speedier neutralization, a device capable of properly balanced generation of positive and negative bipolar ions in higher concentrations is demanded.

For generation of positive and negative bipolar ions for the purpose of neutralization, a variety of electromagnetic waves can also be used. Generally in a method for generating positive and negative bipolar ions with use of electromagnetic waves, an electric charge of ionized gas molecules is conserved. Therefore, the method has a feature that for each polarity ion concentration ratio, ion balance is kept at more or less the same number between positive and negative ions. For example, nitrogen or other impurity molecules in the air are ionized by irradiating air with soft X-rays, whereupon positive ions and electrons are generated. Since a presence time of electrons is very short, oxygen, moisture, and other impurity molecules, etc., in the air are united with the electrons, whereby negative ions are formed. Consequently, generation of bipolar ions containing roughly the same amount of positive and negative ions becomes possible. Devices of this kind are described in Non-patent Document 1 and Patent Document 3, for example.

Other than the above, use of vacuum ultraviolet rays or radiation as electromagnetic waves is also possible, which is disclosed in Patent Documents 4 and 5, respectively.

In the method employing those electromagnetic waves, more powerful electromagnetic waves are necessary in order to meet a demand for generating the foregoing high concentration ions. However, there is a restriction that use of neutralization apparatuses employing radioactive substances that have the strongest energy is allowed only in a licensed facility and only by a person with a handling permit for radioactive substances. Further, even when the aforementioned conditions are satisfied, special care for safety control and storage to eliminate effects on human health involved in the use of radioactive substances must be taken. Similarly, it is necessary in neutralization apparatuses using vacuum ultraviolet rays and soft X-rays to take measures to ensure safety as irradiation energy is higher.

An air discharge voltage (ionization potential) differs between positive and negative ions in the aforementioned positive and negative bipolar ion generation by corona discharge. Thus, control of ion balance is generally difficult. In a form of applying a direct current voltage to a plurality of electrodes, for example, respective discharge voltages need to be controlled separately. In a form of using an alternating current voltage, a center voltage in a waveform needs to be offset etc. In order to control ion balance of positive and negative ions generated by corona discharge, there has been proposed a technique for conducting balance control by providing an ion balance control circuit separately as described in, for example, Patent Document 6 and a method etc., by regulating gas flow for positive and negative ions separately as described in Patent Document 7.

However, none of the methods described above can be a drastic solution to obtain speedy neutralization characteristics with stability for a long period of time. Therefore, development of a technique for generating high concentration ions in a well balanced manner has been demanded.

Another problem in the neutralization apparatus by corona discharge is abrasion of electrodes and buildup of dust etc., associated with long-term operation. They not only become a cause of trouble such as a short circuit between electrodes, static noise, etc., but also affect neutralization performance greatly due to changing the ion balance. In particular, a discharge voltage needs to be increased in a needle-type electrode in general use in order to produce higher concentration ions. In that case, reactive species of ozone and oxygen are generated in high concentrations, so that deterioration of the electrode is found more noticeably. To solve these problems, materials for the needle-type electrode which are low in deterioration (Patent Document 8) etc., have been proposed. However, the buildup of dust and deterioration are unavoidable in the discharge method such as a needle-type electrode in which a high voltage is required and thus an electric charge is concentrated locally. Accordingly, there has been demanded development of a bipolar ion generation element which can produce ions efficiently at a lower voltage, has a material or structure that resists buildup of dust etc., and deterioration and assumes a form in which replacement and maintenance thereof are simple and safe even if deteriorated.

On the other hand, an ion generation element with a configuration that a discharge electrode arranged in one direction on a plane and having minute protrusions is arranged on a dielectric body in order to improve maintainability is described in Patent Documents 9, 10, 11, and 12 as a use of a copier etc., for the purpose of charging and diselectrifying a drum in the vicinity of the ion generation element. Neutralization of a physical object disposed in a position away from the ion generation element by employing the technique described in those Patent Documents, which is different in usage from the latter, is difficult since the ion balance is disrupted due to differences in physical characteristics between positive and negative ions. Further, in the technique as described in Patent Documents 10, 11, and 12, control of the ion balance only by waveform control of a voltage is difficult. For the aforementioned reasons, such devices cannot be put into practical use as neutralization apparatuses in manufacturing processes.

Patent Document 1: Japanese Patent No. 2520840
Patent Document 2: Japanese Patent No. 2627585
Patent Document 3: Japanese Patent No. 2951477
Patent Document 4: Japanese Patent No. 2598363
Patent Document 5: Japanese Patent Pre-Publication No. H8-190993
Patent Document 6: Japanese Patent No. 3471511
Patent Document 7: Japanese Patent No. 2646020
Patent Document 8: Japanese Patent No. 3078819
Patent Document 9: Japanese Patent No. 2665903
Patent Document 10: Japanese Patent Pre-Publication No. 2003-323964
Patent Document 11: Japanese Patent Pre-Publication No. 2003-249327
Patent Document 12: Japanese Patent Pre-Publication No. 2002-237368
Non-patent Document 1: Ionizer and Charge Eliminating Technique, Supervising Editor, Yuji Murata, CMC Publishing Co., Ltd., 2004

SUMMARY OF THE INVENTION

A first object of the present invention is to provide a neutralization apparatus having an ion generation element employing a novel high efficiency discharge method capable of reducing deterioration of electrodes and buildup of dust during long-term operation, which is a problem of the neutralization apparatus using corona discharge by the needle-type electrode, and capable of generating high concentration ions with low ozone concentrations, thereupon achieving speedier neutralization performance than ever before, and to provide a neutralization apparatus having a minute electrode ion generation element that can easily be cleaned or replaced even when dust builds up or deterioration occurs.

A second object of the present invention is to provide a neutralization apparatus allowing for neutralization of a remote physical object, which is a problem of an element with a structure that a dielectric body is sandwiched between discharge electrodes with minute protrusions, being capable of simplifying the control of ion balance and consequently becoming applicable in manufacturing processes.

The present invention to solve the above-mentioned problems has the following configurations.

(1) A neutralization apparatus eliminating static electricity on a surface of a physical object disposed away from an ion generation element by carrying positive ions and negative ions having been generated from the ion generation element by discharge of gas, with the use of gas flow such as air, nitrogen, etc., wherein the ion generation element is a minute electrode ion generation element comprising a discharge electrode arranged in one direction on a plane and provided with a minute protrusion, an induction electrode and a thin dielectric film sandwiched between the electrodes, the ion generation element is composed, in a pair, of a minute electrode ion generation element for generating positive ions in which a voltage applied to a discharge electrode has a positive pulse waveform and a minute electrode ion generation element for generating negative ions in which a voltage applied to a discharge electrode has a negative pulse waveform;

at least one or more ion generation elements, each being in a pair of the minute electrode ion generation element for generating positive ions and the minute electrode ion generation element for generating negative ions, are arranged such that a plane including each discharge electrode is parallel to a direction of gas flow and also the direction of discharge electrode is arranged so as to be perpendicular to the direction of gas flow; and balance control of positive and negative ions in a downstream position of gas flow is comprised to be possible by adjusting a voltage applied to the discharge electrode of the ion generation element.

(2) A neutralization apparatus eliminating static electricity on a surface of a physical object disposed away from an ion generation element by carrying positive ions and negative ions having been generated from the ion generation element by discharge of gas, with the use of gas flow such as air, nitrogen, etc., wherein the ion generation element is composed of a minute electrode ion generation element for generating positive ions and a minute electrode ion generation element for generation of negative ions in which two or more discharge electrodes are arranged in one direction on a plane so as not to intersect with each other and provided with a minute protrusion, and an induction electrode sharing the discharge electrodes are comprised;

at least one or more ion generation elements are arranged such that a plane including each discharge electrode is parallel to a direction of gas flow and also the direction of the discharge electrodes is arranged so as to be parallel to the direction of gas flow; and balance control of positive and negative ions in a downstream position of gas flow is possible by adjusting a voltage applied to the discharge electrode of the ion generation element.

In the present invention, employed is an ion generation element (including a two-wire type and a three-wire type) being a chip-type, having a minute structure of sandwiching a thin dielectric body between a ground electrode and a discharge electrode provided with minute protrusions, and composed of a minute electrode ion generation element for generating positive ions and a minute electrode ion generation element for generating negative ions. Additionally, an effective arrangement of the ion generation element causes discharge with the dielectric body serving as a barrier, that is, dielectric barrier discharge, thereupon allowing for efficient generation of high concentration ions. Further, installing a plurality of electrodes in one element becomes possible. As a result, control of ion balance is facilitated even when a direct current or pulse voltage is applied other than an alternating current voltage generally used. Moreover, downsizing the ion generation element simplifies its structure and innovatively improves maintainability. Since discharge occurs at a plurality of places, a reduction of the problem of local buildup of dust that is seen in the needle-type electrode is overcome.

More specifically, the present invention is an apparatus eliminating static electricity on a surface of a charged object and including an ion generation element that is composed of a minute electrode ion generation element for generating positive ions and a minute electrode ion generation element for generating negative ions in which a minute electrode with a dielectric body serving as a barrier layer is employed, a power supply and a gas flow generating device (gas flow supplying mechanism) for carrying the generated ions. An effective arrangement of the ion generation element generates highly concentrated positive and negative ions properly balanced, whereupon a neutralization apparatus having an ion generation element high in maintainability can be provided.

In the present invention, an ion generation element composed of a minute electrode ion generation element for generating positive ions and a minute electrode ion generation element for generating negative ions with the use of discharge is employed. Since radioactive substances, soft X-rays or vacuum ultraviolet rays are not used, restrictions on use of neutralization apparatuses by a license or handling permit can be removed. Further, handling and storage of the apparatus become easier than one employing radioactive substances.

In the present invention, efficient generation of ions at a relatively low voltage and suppression of ozone concentration are allowed by using highly efficient discharge between minute electrodes with a dielectric body serving as a barrier layer as an ion generation element composed of a minute electrode ion generation element for generating positive ions and a minute electrode ion generation element for generating negative ions. Consequently, load to the electrodes is reduced compared with the conventional needle-type electrode, and thus deterioration of the electrodes can be controlled even over long-term operation.

In the present invention, high concentration positive ions and negative ions on the order of about 3×10 to the 6th power, for example, can be generated respectively. Improvement of neutralization performance about twice as much as conventional apparatuses can be seen. Further, a power supply that produces an applied voltage used for discharge can control its voltage, so that controlling such power supply allows for control of ion balance.

DETAILED DESCRIPTION OF THE PRESENT INVENTION

The present invention exhibits the best neutralization performance when including an ion generation element composed of a minute electrode ion generation element for generating positive ions and a minute electrode ion generation element for generating negative ions in which a discharge electrode and an opposed ground electrode are put together via a thin dielectric film (layer), an effective arrangement of the ion generation element, a power supply for applying a waveform-controlled voltage to the discharge electrode and a gas flow generating device for efficiently carrying the generated positive and negative ions to a charged body being a physical object.

For the ion generation element, a linear metal having a discharge electrode with a plurality of minute protrusions from 0.05 mm to 1 mm inclusive is the most effective. For a dielectric film, a dielectric film such as various kinds of ceramics, glass, mica, etc., having a thickness from 0.05 mm to 1 mm inclusive is used. A form that a ground electrode is disposed so as to embrace the discharge electrode via the dielectric film (layer) allows for generation of the highest concentration ions. When less than 0.05 mm, the protrusion comes to have roughly the same distance as the film thickness of the dielectric film (layer), so that the protrusion does not work effectively and discharge occurs extensively in the entire linear mental electrode. Thus, ozone concentration is increased, which is resultingly impractical. On the other hand, when the protrusion exceeds 1 mm, an electric field concentrates at a distal end in the same manner as using the needle-type electrode, so that deterioration of the electrode due to abrasion during long-term operation becomes large, which is unfavorable.

The discharge electrode of the present invention may be in a form of a line, curve, waveform, saw-tooth, pulse wave, etc., as long as arranged in one direction on a plane.

Such an ion generation element is disposed at the downstream side of the gas flow generating device, and then a variety of waveform-controlled voltages are applied to the discharge electrode. A voltage and a frequency are set to an appropriate value respectively in order to produce more or less the same amount of positive and negative ions. Periodic application of pulse voltages positively and negatively biased for 10 microseconds or less is most effective in restraint of generation of ozone hazardous to human body. In such a case, positive and negative ions can be generated by installing each positive and a negative electrode to each ion generation element.

A neutralization apparatus used in the present invention will be described with reference to FIGS. 1 to 11.

Figure 1:
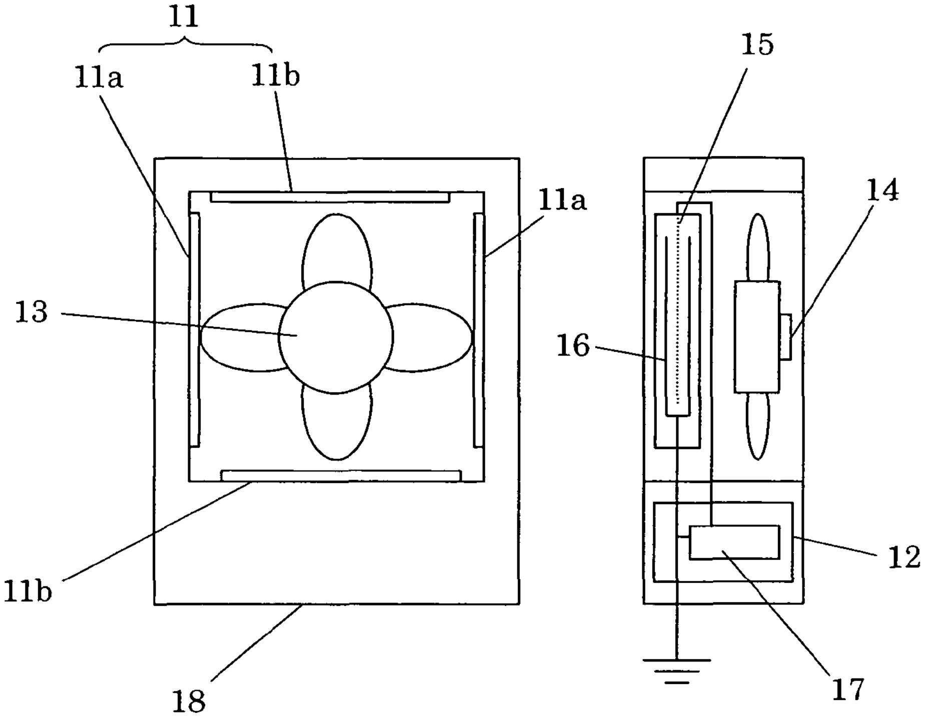
FIG. 1 is a schematic diagram of a neutralization apparatus in an embodiment of the present invention.

An overall block diagram of an example of the neutralization apparatus according to the present invention is shown in FIG. 1. A fan 13 as a gas flow generating device, a power supply casing 12 and an ion generation element 11 are installed inside a body casing 18 of the neutralization apparatus. A high pressure power supply generated from a high voltage generating power supply 17 (31*a*, 31*b*) within the power supply casing 12 is connected to a discharge electrode 15, and an opposed ground electrode 16 is installed. The ion generation element 11 must be able to hold stable discharge when an alternating current voltage or a pulse voltage is applied. In the present invention, a configuration of a dielectric barrier discharge electrode in which a dielectric body is sandwiched by two electrodes is adopted.

Figure 4:
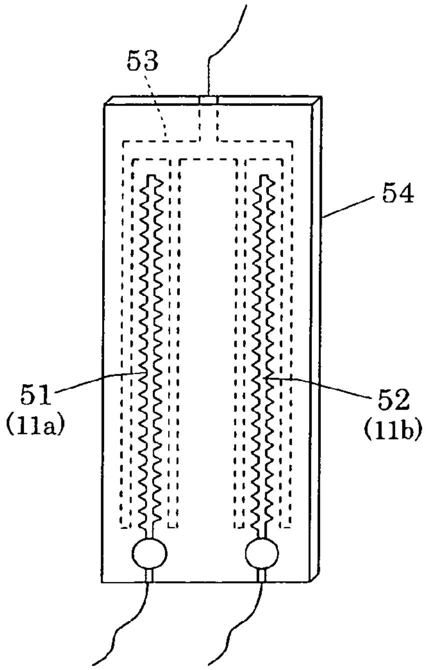
FIG. 4 is a schematic diagram of an electrode configuration of an ion generation element (11) (three-wire type)
Figure 5:
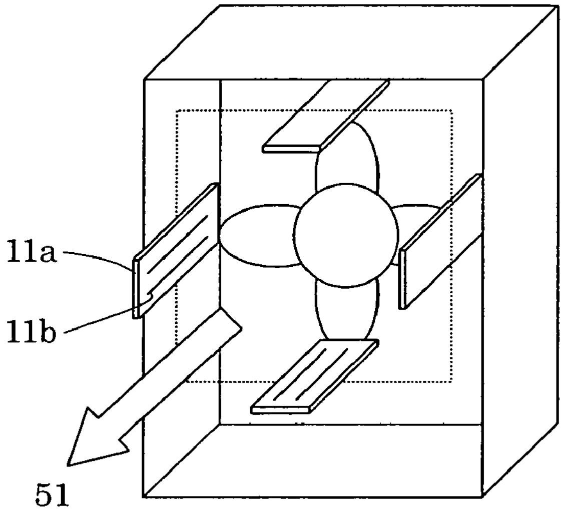
FIG. 5 is a schematic diagram of a neutralization apparatus in which a three-wire type ion generation element is used and its discharge electrodes are arranged parallel to a direction of gas flow (the present invention)
Figure 6:
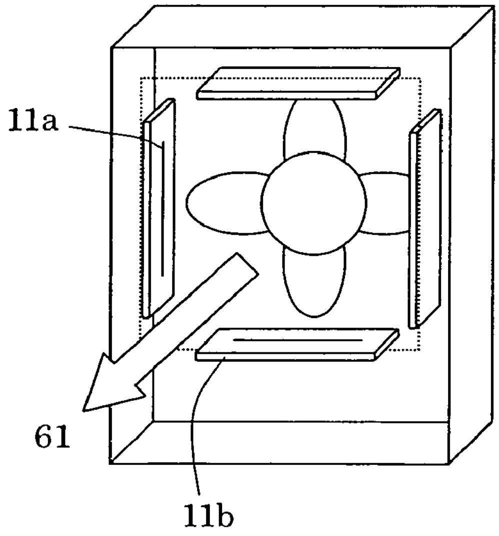
FIG. 6 is a schematic diagram of a neutralization apparatus in which a two-wire type ion generation element is used and its discharge electrode is arranged perpendicular to a direction of gas flow (the present invention)

The ion generation element is a minute electrode ion generation element having a discharge electrode with minute protrusions, an induction electrode and a thin dielectric film sandwiched between them. The ion generation element is composed, in a pair, of a minute electrode ion generation element 11*a* for generating positive ions in which a voltage applied to the discharge electrode has a pulse waveform positively biased, and a minute electrode ion generation element 11*b* for generating negative ions in which a voltage applied to the discharge electrode has a pulse waveform negatively biased. At least one (one pair of) ion generation element 11 in a pair of the minute electrode ion generation element 11*a* for generating positive ions and the minute electrode ion generation element 11*b* for generating negative ions is installed such that a plane including respective discharge electrodes is parallel to a direction of gas flow and the discharge electrodes are arranged perpendicular to the direction of gas flow (see FIGS. 1 and 6; they are examples where two (two pairs) are installed). Although even one (one pair) as above exerts an effect, neutralization performance can be further enhanced by installing a plurality (a plurality of pairs) of ion generation elements, as shown in FIGS. 1 and 6. As for arrangements of the electrodes in that case, an alternating current voltage or high frequency voltage may be applied to a two-wire type ion generation element (a first aspect of the present invention) shown in FIG. 3 in detail to generate positive and negative ions. Alternatively, a pulse voltage may be used to generate ions of each polarity by turns. An arrangement able to obtain good neutralization performance is when a three-wire type ion generation element (a second aspect of the present invention) shown in FIG. 4 is applied with a positive and a negative pulse voltage respectively and is arranged such that a plane including the discharge electrodes is parallel to a direction of gas flow and also the discharge electrodes are arranged to be parallel to the direction of gas flow. In that case, each of the positive and negative ions can be generated in high concentrations. The three-wire type ion generation element shown in FIG. 4 must be arranged such that not only a plane including each discharge electrode is parallel to a direction of gas flow but also the discharge electrodes are arranged so as to be parallel to the direction of gas flow (see FIG. 5). When the discharge electrodes of the ion generation element are arranged perpendicular to gas flow, generated ions are captured by antipolar ions generated from downstream electrodes, which is accordingly not within the present invention.

Figure 2:
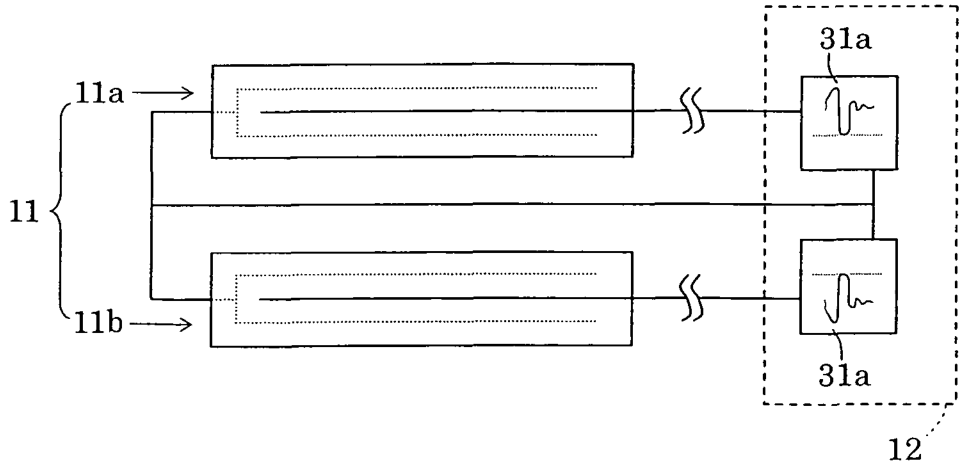
FIG. 2 is a circuit diagram of the above.
Figure 3:
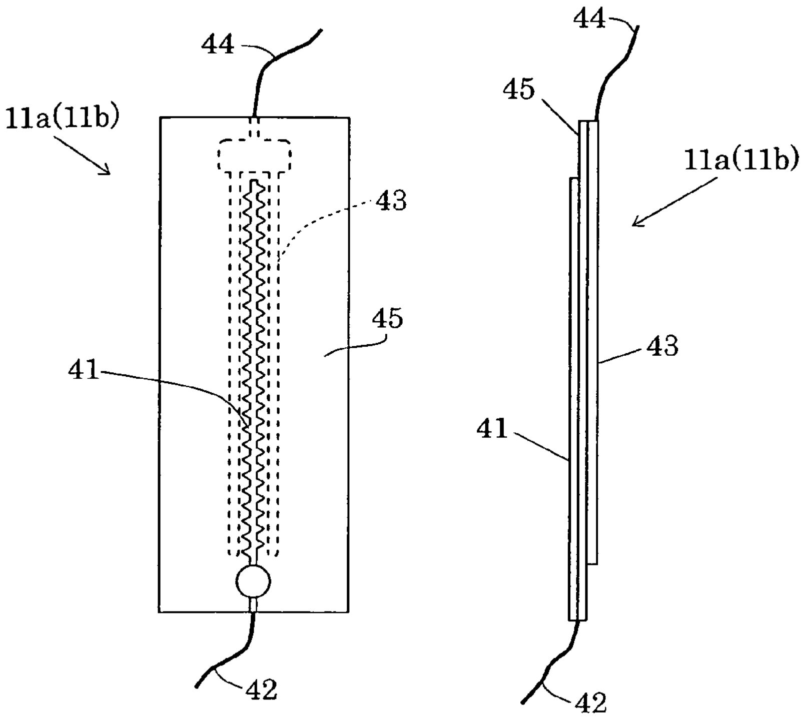
FIG. 3 is a schematic diagram of an electrode configuration of a minute electrode ion generation element (11*a* or 11*b*) for generating positive or negative ions (two-wire type)

A structure of the two-wire type ion generation element 11*a* (or 11*b*) is shown in FIG. 3. A voltage is applied to a discharge electrode 41 via a lead wire 42. A ground electrode 43 is arranged in a periphery of the discharge electrode 41 so as to surround the latter via a thin dielectric film (layer) 45. A spacing between the discharge electrode 41 and the ground electrode 43 is to be minimized to the extent able to obtain stable discharge. This concentrates an electric field on a distal end and increases ion generation efficiency even at a low voltage. Since the dielectric film 45 has high insulativity, there is no safety hazard if the discharge electrode 41 is overlapped with the ground electrode 43 via the dielectric film 45. The ground electrode 43 is preferably grounded via a lead wire 44, except where a potential difference between both electrodes is kept, since an absolute value of the potential difference is important in generation of ions. In the present invention, as shown in FIG. 2, a positive pulse high voltage generating power supply 31*a* is connected to the minute electrode ion generation element 11*a* for generating positive ions and a negative pulse high voltage generating power supply 31*b* is connected to the minute electrode ion generation element 11*b* for generating negative ions as the power supply 12.

A structure of the three-wire type ion generation element is shown in FIG. 4. A positive and a negative pulse voltage are applied to discharge electrodes 51 and 52. In the same manner as the two-wire type one, a ground electrode 53 is arranged so as to surround the discharge electrodes 51 and 52 via a thin dielectric film (layer) 54. When an alternating current voltage is applied to, for example, the two-wire type element, a center voltage needs to be biased for control of ion balance since each polarity ionization voltage is different. However, in the three-wire type element, positive and negative bipolar ions can be generated in the identical element. Further, each polarity ion concentration can be controlled independently by each polarity voltage, so that controllability of the ion balance can be improved.

EXAMPLES

Hereinafter, the present invention is exemplified as giving examples.

Example 1

In order to optimize a voltage and a waveform applied to a discharge electrode to generate roughly the same number of high concentration positive and negative ions, ion number concentrations according to polarity were measured in various conditions in the apparatus of the present invention.

An example of the measurement results are shown in Table 1. For measurement of each polarity ion concentration, a Gerdien type ion counter was used, and a sampling flow rate was controlled to be 5 liters per minute by a mass flow controller. For detection of ions, a high sensitive amperemeter whose noise level is one femtoampere or less was used. The ion generation element 11 was mounted in the body casing 18 of the neutralization apparatus in a state shown in FIG. 1, and ions were carried by gas flow caused by the fan 13 at an air volume of about 1 cubic meter per minute. A distance between the ion counter and the ion generation element 11 was kept at 10 cm.

Figure 11:
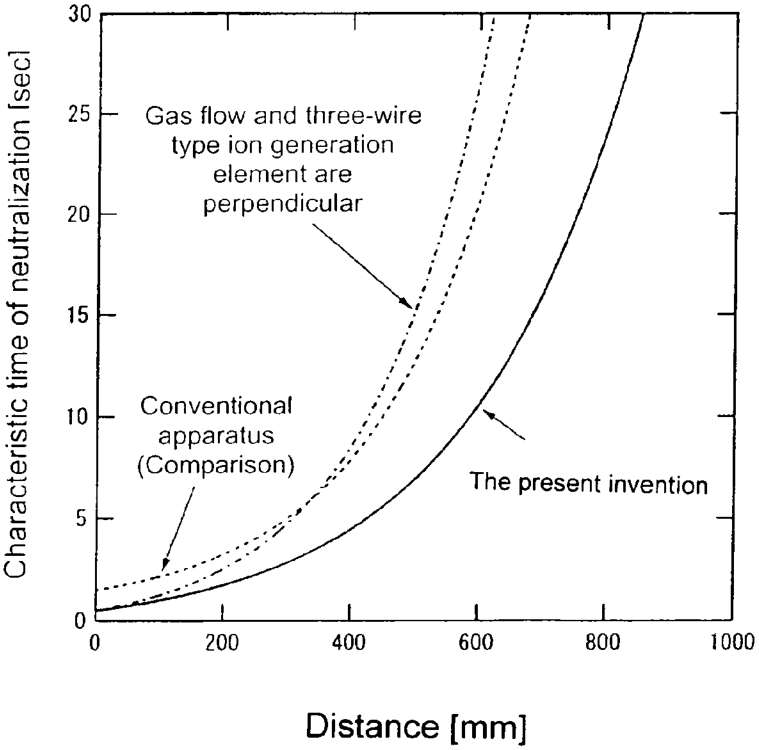
FIG. 11 is a distance characteristic of neutralization time.
Figure 12:
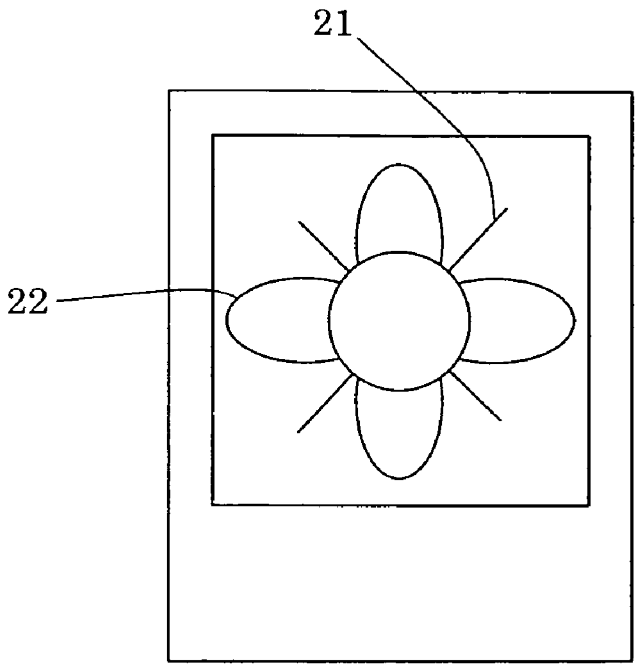
FIG. 12 is a schematic diagram of a neutralization apparatus using a conventional needle-type electrode.

In the case of an alternating current, it was observed that negative ion concentrations sometimes far exceeded positive ion concentrations. This is because an air discharge voltage has different characteristics between polarities. As will be described in Example 2 below, however, the neutralization performance can be improved by increasing (biasing) a center voltage of a sine wave. Regarding the arrangement of the ion generation element and gas flow, the highest concentration ions could be carried far when the plane (element electrode face) including the discharge electrodes was arranged so as to be parallel to a direction of gas flow as shown in FIG. 1. On the other hand, decline in neutralization performance was found in a position spatially apart as shown in FIG. 11 when the plane faced to a neutralization target.

Figure 9:
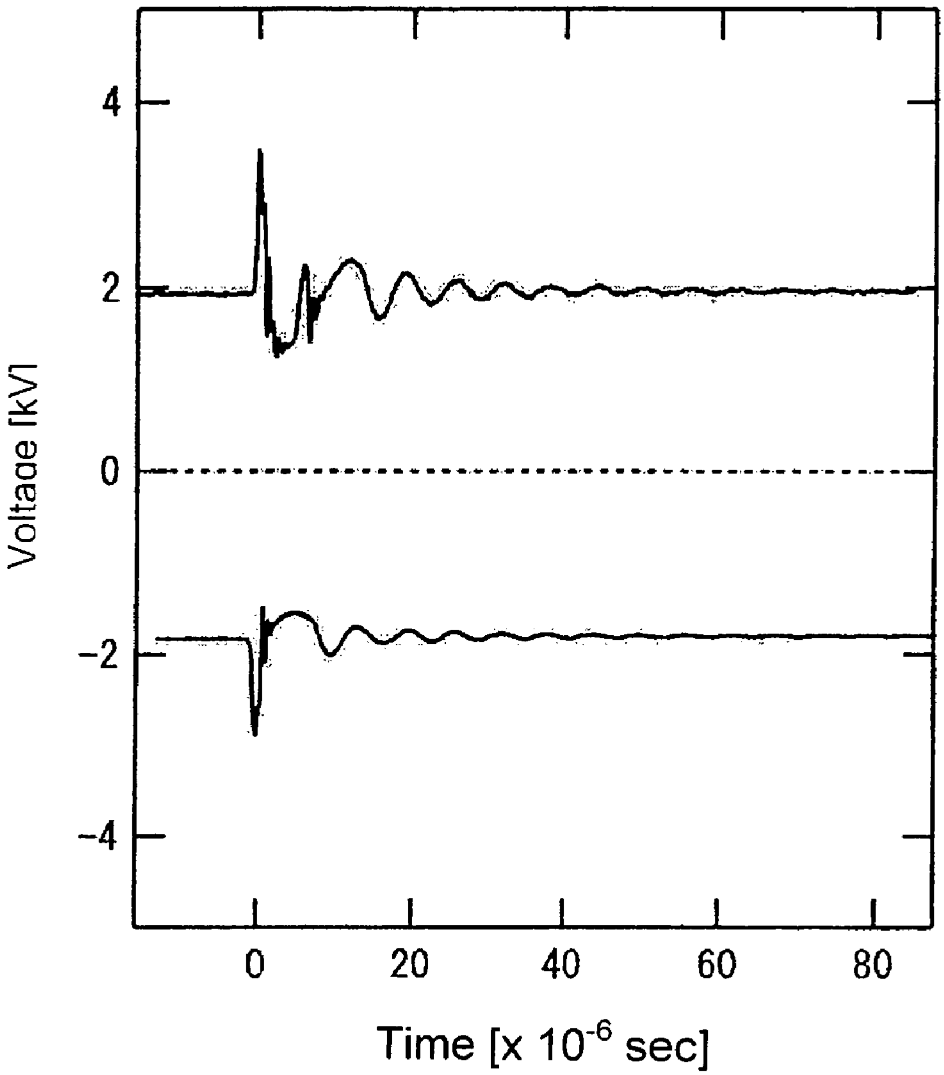
FIG. 9 is a pulse voltage waveform used to the ion generation element (11)

In the case of using a pulse voltage in the three-wire type ion generation element, generation of the highest concentration ions was observed especially when the ion generation element 11 was arranged such that the direction of discharge electrodes were arranged so as to be parallel to gas flow (see FIG. 5) among positions where the element electrode face and a direction of gas flow were parallel. Generation of positive and negative ions in more or less the same concentrations was available by controlling respective peak voltages. Their pulse waveforms are shown in FIG. 9. In this case, the ion concentrations could be controlled at a given value in the range of roughly $1\times10^6$ to $3\times10^6$ number/ml in each polarity. In Table 1, the positive ion concentrations are shown at slightly high values. This is because the best performance was obtained at such an ion balance in evaluation of neutralization performance as will be described later. This phenomenon is presumed to result from differences in physical characteristics between positive and negative ions.

On the other hand, when the three-wire type ion generation element 11 was arranged such that two discharge electrodes were arranged so as to be perpendicular to gas flow (see FIG. 7), a big drop-off in ion concentration was observed since upstream ions, that is, negative ions in Table 1 were captured by an electric field. Neutralization performance in this state eventually becomes very poor, too. However, the phenomenon suggests that the ion balance can be controlled by regulating an angle to the gas flow. Further, in the case of the two-wire type ion generation element (see FIG. 6 and FIG. 8), as shown in Table 1, the ion balance could be controlled even if the discharge electrodes were arranged so as to be perpendicular to the gas flow (see FIG. 6) by using at least one (one pair of two pieces) ion generation element to generate unipolar ions from its elements 11*a* and 11*b* on another polarity basis.

As a target, ion concentrations generated by a current commercial neutralization apparatus and a radiation source (Americium 241) were listed. Although it has to be considered that measurement conditions are not identical in the radiation source due to a different mode from the ion generation element, it can be understood that the present invention achieved a high ion concentration at a close level to the radiation source which has high energy. Compared with the conventional apparatus, too, the present invention achieved a nearly two-fold ion concentration. In the conventional needle-type electrode, a high voltage at 7 to 8 kV or more had to be applied. However, it can be understood that employing the minute electrode configuration allows for generation of high concentration ions at less than approximately half the voltage. Further, the data listed in Table 1 is about local ion concentrations by sampling. However, improvement of neutralization performance was seen compared with other techniques even when a target was larger, since installation of a plurality of pairs of the ion generation elements 11 in a pair of the minute electrode ion generation element 11*a* for generating positive ions and the minute electrode ion generation element 11*b* for generating negative ions as shown in FIG. 1 allows a space in high ion concentrations to be widened.

The present invention of experiment No. 4 in Table 1 is such that the direction of discharge electrodes can be arranged so as to be perpendicular to gas flow and thus the rectangular element can be installed space-savingly, and accordingly is more preferable than the present invention of experiment No. 2 in that the entire neutralization apparatus can be downsized and slimmed down. On the other hand, in the present invention of experiment No. 2, more ion generation elements and discharge electrodes can be installed in line than the present invention of experiment No. 4. Accordingly, the present invention of experiment No. 2 is preferable in that high concentration ions well-balanced in polarities can be generated in a larger space.

TABLE 1

Figure 7:
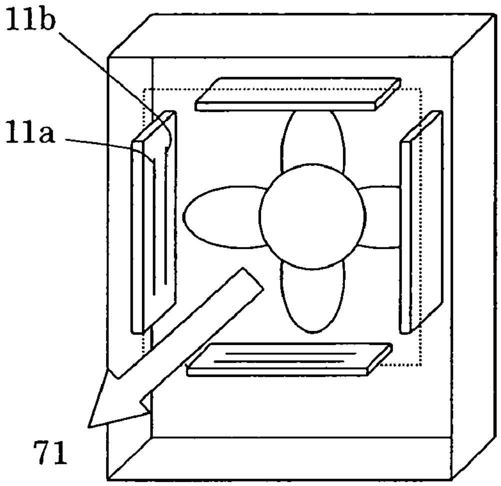
FIG. 7 is a schematic diagram of a neutralization apparatus in which a three-wire type ion generation element is used and its discharge electrodes are arranged perpendicular to a direction of gas flow (comparison)
Figure 8:
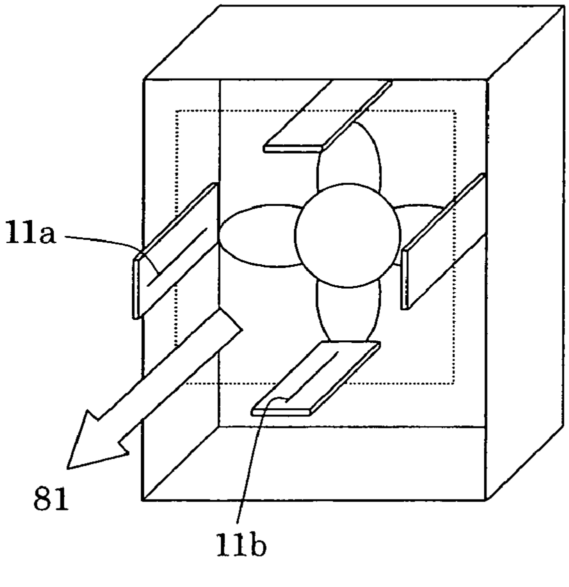
FIG. 8 is a schematic diagram of a neutralization apparatus in which a two-wire type ion generation element is used and its discharge electrode is arranged parallel to a direction of gas flow (comparison)

| Experiment No. | Power supply | Conditions | Positive ion concentration ($10^6$ number/ml) | Negative ion concentration ($10^6$ number/ml) | Remarks |
|---|---|---|---|---|---|
| 1 | Alternating current (3 kV, 2 kHz) | 2-wire type elements × 4 pieces | 0.01 | 1.1 | Comparison |
| 2 | Pulse (waveform: FIG. 9) | 3-wire type elements × 4 pieces (arrangement: FIG. 5) | 2.6 | 1.6 | Present invention |
| 3 | Pulse (waveform: FIG. 9) | 3-wire type elements × 4 pieces (arrangement: FIG. 7) | 1.0 | 0.03 | Comparison |
| 4 | Pulse (waveform: FIG. 9) | 2-wire type elements × 2 pieces per polarity (arrangement: FIG. 6) | 1.9 | 1.9 | Present invention |
| 5 | Pulse (waveform: FIG. 9) | 2-wire type elements × 2 pieces per polarity (arrangement: FIG. 8) | 0.7-1.5 (Varying according to positions) | 0.7-1.5 (Varying according to positions) | Comparison |

TABLE 1-continued

| Experiment No. | Power supply | Conditions | Positive ion concentration ($10^6$ number/ml) | Negative ion concentration ($10^6$ number/ml) | Remarks |
|---|---|---|---|---|---|
| 6 | (Target) Needle-type electrode neutralization apparatus | Commercial neutralization apparatus (model No. PB100 of FISA Corporation) | 1.0 | 1.3 | Comparison |
| 7 | (Target) Radiation source | Americium 241 | 2.8 | 2.5 | Comparison |

Example 2

Figure 10:
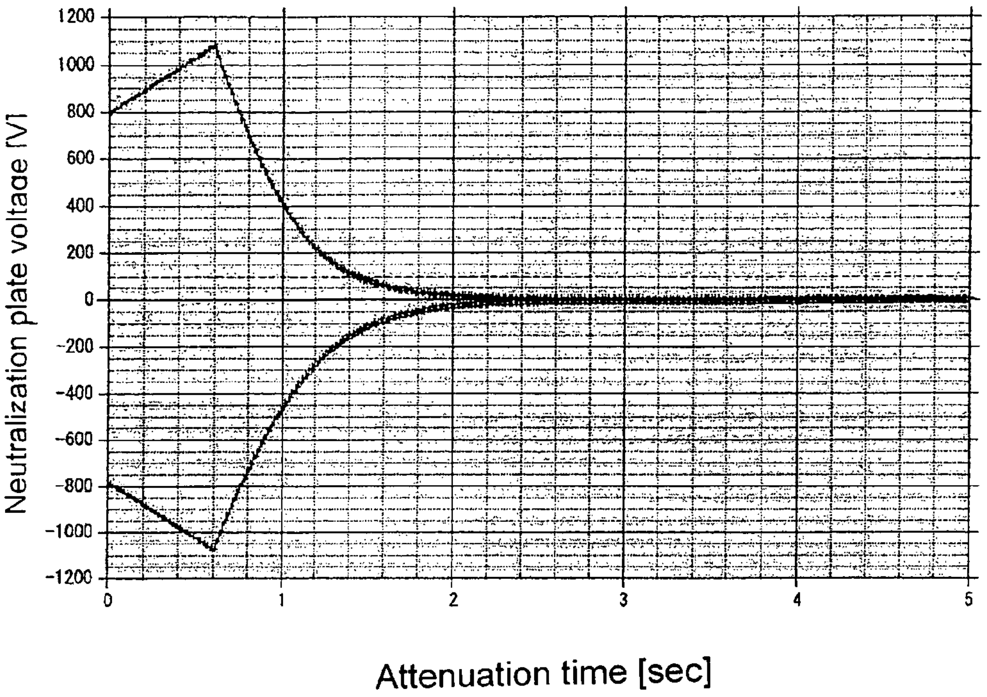
FIG. 10 is an attenuation curve of an electric charge in a neutralization evaluating device.

Neutralization performance was measured under the conditions listed on Table 1 in the apparatus of the present invention. For evaluation of the neutralization performance, a charged plate monitor (model 158) of TREK Japan KK was used. A distance between the neutralization apparatus and the charged plate was kept at 10 cm, the same distance as in the ion concentration measurement. A typical attenuation curve is shown in FIG. 10, where a process of a voltage that keep being attenuated can be seen by irradiating the plate having been applied with a voltage up to 1100V with positive and negative bipolar ions emitted from the neutralization apparatus. Here, an attenuation time from 1000V to 100V is summed up in Table 2 as a characteristic time of neutralization.

In the case of a bias-free alternating current, the negative ion concentration is two-order higher than the positive ion concentration as shown in Table 1. Thus, attenuation of the positive voltage was fast, and the negative voltage hardly attenuated. When a center voltage of a sine wave at about 130V was positively biased, attenuation times became roughly equal between the positive and the negative voltage, and speedier neutralization characteristics than conventional apparatuses could be obtained.

ion generation elements 11*a* and 11*b* for generating ions. Ozone concentration was below the detection limit (below several ppb) in every case if a fan was driven. When the fan was stopped for example, high concentration ions exceeding several ppm were detected according to circumstances in the case of the needle-type electrode or the alternating current power supply. By comparison, in the case of using the pulse power supply, generation of ozone was little and below environmental standards (100 ppb) in every case. Therefore, safety could be verified even if the fan stopped.

The present invention of experiment No. 13 in Table 2 can obtain ion generation in a larger space than the present invention of experiment No. 15. The amount of ions to be delivered to a neutralization target per unit of time is increased by carrying the ions by gas flow. Accordingly, the present invention of experiment No. 13 is more preferable in that a shorter neutralization time is available. On the other hand, the present invention of experiment No. 15 is preferable in that the entire apparatus can be downsized since the installation space of the element is small, although the amount of ions to be delivered is less than that of the present invention of experiment No. 13. Further, a comparative example of experiment No. 16 is inferior in that spatial variations of ions are larger than those of the present invention of experiment No. 15 and thus a speedy neutralization time is not obtainable.

TABLE 2

| Experiment No. | Power supply | Conditions | Positive voltage attenuation time (sec) | Negative voltage attenuation time (sec) | Remarks |
|---|---|---|---|---|---|
| 11 | Alternating current (3 kV, 2 kHz) | 2-wire type elements × 4 pieces | 1.6 | Unmeasurable | Comparison |
| 12 | Alternating current (biased +130 v) | 2-wire type elements × 4 pieces | 1.3 | 1.6 | Comparison |
| 13 | Pulse (waveform: FIG. 9) | 3-wire type elements × 4 pieces (arrangement: FIG. 5) | 0.8 | 0.9 | Present invention |
| 14 | Pulse (waveform: FIG. 9) | 3-wire type elements × 4 pieces (arrangement: FIG. 7) | Unmeasurable | 9.4 | Comparison |
| 15 | Pulse (waveform: FIG. 9) | 2-wire type elements × 2 pieces per polarity (arrangement: FIG. 6) | 1.5 | 1.9 | Present invention |
| 16 | Pulse (waveform: FIG. 9) | 2-wire type elements × 2 pieces per polarity (arrangement: FIG. 8) | 2.1 | 2.6 | Comparison |
| 17 | (Target) Needle-type electrode neutralization apparatus | Commercial neutralization apparatus (model No. PB100 of FISA Corporation) | 1.9 | 2.3 | Comparison |

Subsequently, in the case of a pulse waveform, about half the characteristic time of neutralization compared with the conventional apparatuses could be achieved in the best case, although it depends on arrangements of the minute electrode A change in a characteristic time of neutralization relative to a distance from the ion generation element in the apparatus of the present invention is shown in FIG. 11. It is understood that, compared with the conventional apparatuses, speedy neutralization of a target disposed farther away was possible by carrying generated ions by gas flow. Further, as shown in FIG. 7, equal performance was obtained in a short distance but neutralization performance was reduced more than the conventional apparatuses with distance when the three-wire type ion generation element was arranged such that the direction of discharge electrodes were arranged so as to be perpendicular to gas flow. This is a consequence that the delivery of gas flow was not efficiently conducted due to counteraction of positive and negative ions as described above.

In a position below 50 mm apart, mixture of gas flow was not uniform, which is impractical. Further, in a position 1 m or more away, it is seen that neutralization performance was reduced due to effects of dispersion of gas flow and diffusion of ions.

The neutralization apparatus of the present invention employs an ion generation element by dielectric barrier discharge. Consequently, high concentration positive and negative bipolar ions can be generated with high efficiency. By carrying the ions efficiently by gas flow, innovative high speed neutralization nearly twice as fast as conventional apparatuses becomes possible, so that the apparatus of the present invention can be used to reduce static trouble in a variety of manufacturing processes. Further, electromagnetic waves such as radioactive substances, vacuum ultraviolet rays, etc., which are hazardous to the human body are not used. Therefore, the restrictions on using the apparatus by a license or handling permit are removed. Still further, by combining a pulse power supply, occurrence of ozone hazardous to the human body becomes rare even if gas flow is stopped, and abrasion of electrodes due to long-term use can also be reduced. This progressively improves the maintainability, and the electrodes can be replaced easily even if they get dirty. Selecting a material for a dielectric body and an electrode adequately allows for manufacturing of inexpensive elements. In view of cost performance, the apparatus of the present invention can widely be used as a substitute for a conventional needle-type electrode, not exclusive to neutralization in manufacturing processes.

What is claimed is:

1. A neutralization apparatus eliminating static electricity on a surface of a physical object disposed away from an ion generation element by carrying positive ions and negative ions having been generated from the ion generation element by discharge of gas, with the use of gas flow wherein the ion generation element is a minute electrode ion generation element comprising a discharge electrode arranged in one direction on a plane and provided with a minute protrusion, an induction electrode and a thin dielectric film sandwiched between the electrodes, the ion generation element is composed, in a pair, of a minute electrode ion generation element for generating positive ions in which a voltage applied to a discharge electrode has a positive pulse waveform and a minute electrode ion generation element for generating negative ions in which a voltage applied to a discharge electrode has a negative pulse waveform;

at least two pairs of ion generation elements, each being in a pair of the minute electrode ion generation element for generating positive ions and the minute electrode ion generation element for generating negative ions, are arranged such that a plane including each discharge electrode is parallel to a direction of gas flow and also the direction of discharge electrode is arranged so as to be perpendicular to the direction of gas flow;

each pair of the minute electrode ion generation element for generating positive ions and the minute electrode ion generation element for generating negative ions are arranged opposite each other with respect to the direction of gas flow; and balance control of positive and negative ions in a downstream position of gas flow is comprised to be possible by adjusting a voltage applied to the discharge electrode of the ion generation element.

2. The neutralization apparatus according to claim 1, wherein at least two or more pairs of two-wire type ion generation elements, each being composed, in a pair, of a minute electrode ion generation element for generating positive ions in which a voltage applied to a discharge electrode has a positive pulse waveform and a minute electrode ion generation element for generating negative ions in which a voltage applied to a discharge electrode has a negative pulse waveform, are arranged.

3. The neutralization apparatus of claim 1, wherein each discharge electrode of each minute electrode ion generation element has a longitudinal dimension extending in a direction perpendicular to the direction of gas flow.

4. The neutralization apparatus of claim 3, wherein each minute electrode ion generation element for generating positive ions and each minute electrode element for generating negative ions are perpendicular to each other.

5. A neutralization apparatus for eliminating static electricity on the surface of an object, the apparatus comprising:

at least two pairs of ion generation elements;

a gas flow generator for generating a gas flow and carrying positive and negative ions generated by said ion generation elements to said object;

each pair of ion generation elements including a minute electrode ion generation element for generating positive ions when a positive pulse waveform voltage is applied to a discharge electrode and a minute electrode ion generation element for generating negative ions when a negative pulse waveform voltage is applied to a discharge electrode, each minute electrode ion generation element including a discharge electrode having minute protrusions, an induction electrode and a thin dielectric film sandwiched between the electrodes, the discharge electrodes being oriented in a plane, parallel to the direction of gas flow, and having a longitudinal dimension extending perpendicular to the direction of gas flow, said minute electrode ion generation elements for generating positive ions facing each other and said minute electrode generating elements for generating negative ions facing each other; and a balance control unit for balancing the positive and negative ions in the gas flow by adjusting the voltage applied to the discharge electrodes.

6. The neutralization apparatus of claim 5, wherein said discharge electrodes for generating positive ions of each pair of ion generation elements are parallel to and spaced apart from each other;

said discharge electrodes for generating negative ions of each pair of ion generation elements are parallel to and spaced apart from each other with respect to the direction of gas flow; and said discharge electrodes for generating negative ions and said discharge electrode for generating positive ions of each pair of ion generation elements are perpendicular to each other.

* * * * *